United States Patent [19]

Leupold et al.

[11] Patent Number: 5,434,462
[45] Date of Patent: * Jul. 18, 1995

[54] HIGH-POWER ELECTRICAL MACHINERY

[75] Inventors: Herbert A. Leupold, Eatontown, N.J.; John T. Rehberg, Orefield, Pa.

[73] Assignee: The United States of America as represented by the Secretary of the Army, Washington, D.C.

[*] Notice: The portion of the term of this patent subsequent to May 3, 2011 has been disclaimed.

[21] Appl. No.: 189,857

[22] Filed: Feb. 1, 1994

Related U.S. Application Data

[60] Division of Ser. No. 33,654, Mar. 16, 1993, Pat. No. 5,309,055, which is a continuation-in-part of Ser. No. 654,476, Feb. 13, 1991, abandoned.

[51] Int. Cl.$^6$ .................................... H02K 31/00
[52] U.S. Cl. ................................ 310/178; 310/154; 310/248; 310/268
[58] Field of Search ............... 310/268, 178, 102 A, 310/154, 177, 219, 248, 102 R, 166, 113, 112; 322/48

[56] References Cited

U.S. PATENT DOCUMENTS

| | | | |
|---|---|---|---|
| 645,943 | 3/1900 | Dalen et al. | 310/268 |
| 742,600 | 10/1903 | Cox, Jr. | 310/178 |
| 1,504,109 | 8/1924 | Erban | 310/112 |
| 2,433,390 | 12/1947 | Packer | 310/113 |
| 2,722,652 | 11/1955 | Brainard | 310/113 |
| 3,252,053 | 5/1966 | Paddison | 310/268 |
| 4,639,626 | 1/1987 | McGee | 310/268 |
| 4,837,542 | 6/1989 | Leupold | 335/306 |
| 4,945,273 | 7/1990 | Pinkerton | 310/268 |
| 4,994,777 | 2/1991 | Leupold et al. | 335/302 |
| 5,063,004 | 11/1991 | Leupold | 264/22 |
| 5,309,055 | 5/1994 | Leupold et al. | 310/178 |

FOREIGN PATENT DOCUMENTS 0516890 4/1921 France ................................ 310/178

OTHER PUBLICATIONS

Encyclopedic Dictionary of Electronics & Nuclear Engineering; R. I. Sarbacher; Prentice-Hall, Inc.; Englewood Clifs, N.J. (No month, 1959); pp. 597, 598.

*Primary Examiner*—R. Skudy
*Attorney, Agent, or Firm*—Michael Zelenka; William H. Anderson

[57] ABSTRACT

An electrical machine having a stator formed from a pair of cup-shaped permanent magnets symmetrically disposed on opposite sides of a conductive, disk-shaped rotor. The magnets are polarized such that a portion of their external magnetic flux passes in one direction through a short peripheral gap formed by the magnets in which the periphery of the rotor is disposed. The remainder of the external magnetic flux substantially passes in the opposite direction through a cavity defined by the inner volume of the cup-shaped magnets. The inner portion of the disk-shaped rotor is disposed in this cavity. One embodiment of the invention implements the cup-shaped magnets with modified "magic spheres" mounted on either side of the conductive disk-shaped rotor. Other embodiments use a magnetic plate on one side of the disk-shaped rotor to act as a magnetic mirror for a cup-shaped magnet mounted on the other side of the rotor. In still another embodiment, the magnets are mounted as rotors while the conductive disk is the stator. The machine may be used as a homopolar generator or a homopolar motor.

5 Claims, 7 Drawing Sheets

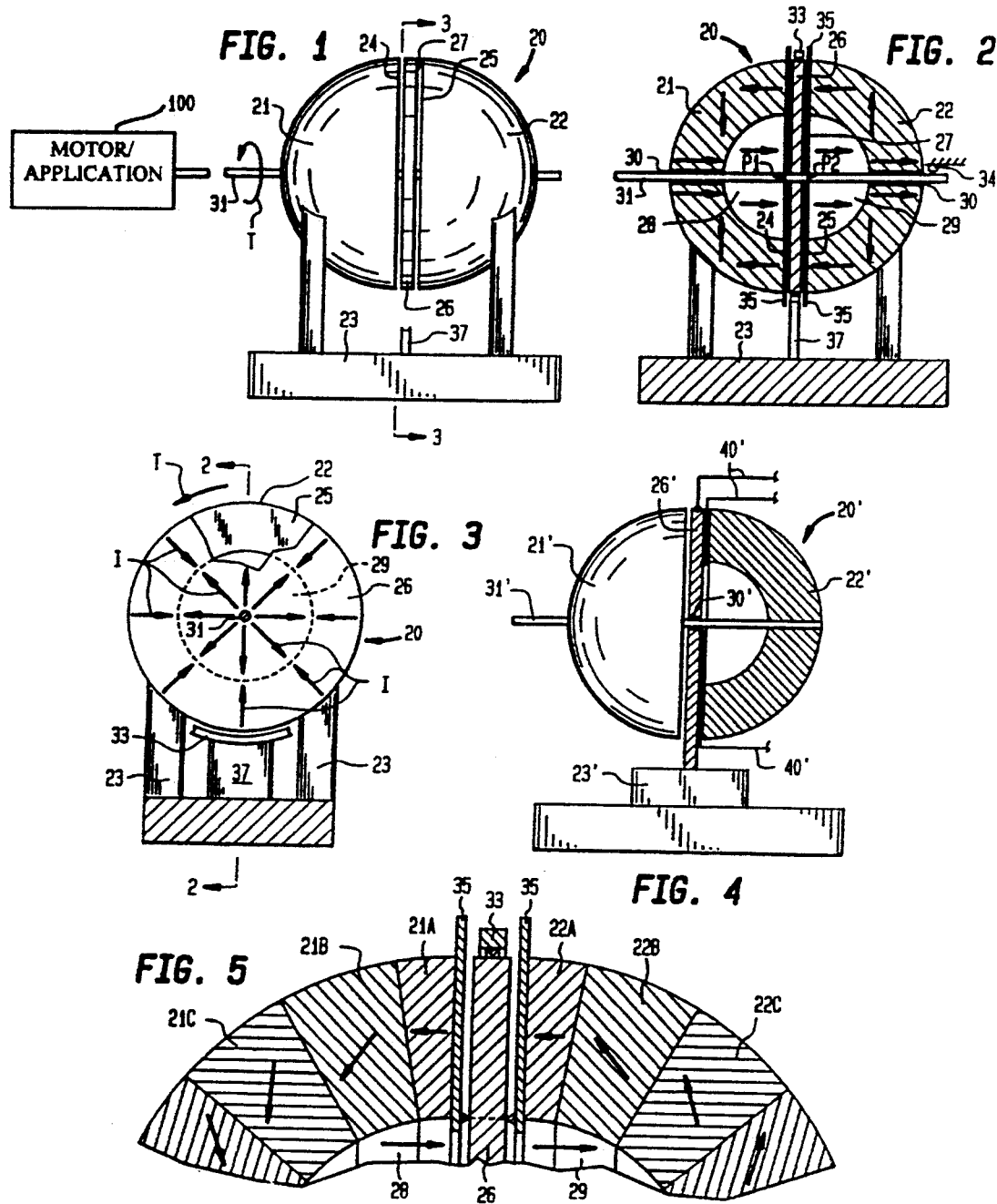

HIGH-POWER ELECTRICAL MACHINERY

GOVERNMENT INTEREST

The invention described herein may be manufactured, used, and licensed by or for the United States Government without the payment to me of any royalties thereon.

CONTINUATION-IN-PART

This application is a division of application Ser. No. 08/033,654, filed Mar. 16, 1993, now U.S. Pat. No. 5,309,055, which is a continuation-in-part of U.S. Application Ser. No. 07/654,476, entitled, "HIGH-POWER ELECTRICAL MACHINERY," filed Feb. 13, 1991, now abandoned. Priority of the above listed U.S. Application is claimed.

BACKGROUND OF THE INVENTION

1. Field of the Invention

The present invention relates to electrical machinery and, more particularly, to homopolar, direct-current motors and generators capable of producing high output torques and high output currents, respectively.

2. Description of the Prior Art

Unipolar, homopolar, or acyclic generators and/or motors are generators/motors in which a unidirectional electromotive force is generated, thus eliminating the need for commutation as is necessary in the ordinary direct current (DC) generators/motors. The operating principles of these homopolar machines are described in such texts as *Encyclopedic Dictionary of Electronics and Nuclear Engineering,* by R. I. Sarbacher, Prentice-Hall, Inc., Englewood Cliffs, N.J. (1959), pg. 597–598. An example of such a homopolar machine, in its simplest form, is a Faraday disc generator which is merely a metal disc rotated between the poles of a magnet. Brushes are placed at the rim and center of the disc and an electromotive force is generated in the disc when either a current is applied to the disc or the disc is rotated. Of course, the efficiency of this system is greatly improved if an annular field whose axis passes through the center of the generator shaft is used. When an annular field is used, the electromotive force developed in any ring is constant so that all current paths in the disc are radially oriented. Generally, these machines generate very low electromotive forces even at high speeds and thus, the application of these machines, in their simplest form, has been limited to applications where low voltage and high current are required.

Accordingly, one of the most critical problems confronting designers of high-power electrical machinery has been simplifying their construction while not adversely effecting their ability to produce high powers. In the recent past, those concerned with designing electrical generators having high output currents and motors having high output torques have turned to the use of superconducting magnets. For example, electrical motors having superconducting magnets are currently being considered for ship propulsion where high torque outputs are critical. Although superconducting machines can serve the purpose in many situations, they are not entirely satisfactory under all conditions of service because of the considerable expense involved in manufacturing and maintaining the superconducting magnets. Such magnets normally include electromagnetic coils made of a special superconductive material that must be kept at relatively low temperatures during machine operation. Further, the added bulk of most superconducting magnets and their power supplies makes their use undesirable in many environments, e.g. aboard ship, where space is critical. It has been recognized, therefore, that electrical motors and generators that employ superconducting magnets, while capable of producing the high magnetic fields required in high-power machines, are relatively more expensive and complicated to manufacture and maintain and more cumbersome to use than are their conventional counterparts.

Consequently, those concerned with the development of high-power electrical machinery have recognized the need for improved techniques of developing conventional-type electrical machinery capable of high-power operation that are not unduly complicated and expensive to manufacture and maintain. The present invention fulfills this need.

SUMMARY OF THE INVENTION

The general purpose of this invention is to provide an electrical machine capable of high-power outputs which embraces all the advantages of similarly employed machines, superconducting or otherwise, and possesses none of the aforedescribed disadvantages. To obtain this, the present invention contemplates a unique stator and rotor arrangement whereby a significant portion of the active magnetic field is coupled to the current-carrying conductors. In general, the invention is directed to an electrical machine comprising a permanent magnet having a cup-shaped shell with an outer rim and a hollow cavity, and wherein the magnetic orientation in the shell varies over the shell to produce an external magnetic field in a first direction adjacent the rim and in a second direction opposite to the first direction in the cavity. An electrically conductive member is mounted adjacent the magnet and lies in the external magnetic field. Means is provided for causing relative rotation of the conductive member and the magnet with respect to each other.

More specifically, one embodiment of the invention comprises a stator formed from a pair of cup-shaped permanent magnets symmetrically disposed on opposite sides of a conductive, disk-shaped rotor. The magnets are polarized such that a portion of their external magnetic flux passes in one direction through a short peripheral gap formed by the magnets in which the periphery of the rotor is disposed. Further, the remainder of the external magnetic flux substantially passes in the opposite direction through a cavity defined by the inner volume of the cup-shaped magnets. The inner portion of the disk-shaped rotor is disposed in this cavity.

One embodiment of the invention implements the cup-shaped magnets with modified "magic spheres" mounted on either side of the conductive disk-shaped rotor. Other embodiments use a magnetic plate on one side of the disk-shaped rotor to act as a magnetic mirror for a cup-shaped magnet mounted on the other side of the rotor. The magnetic mirror produces an anti-image of the cup-shaped magnet. In still another embodiment, the magnets are mounted as rotors while the conductive disk is the stator. The conductive disks of the various embodiments are connected by circuitry to an external utilization device. Depending on the nature of the utilization device and the circuit configuration, the electrical machine may operate as either a homopolar generator or a homopolar motor.

BRIEF DESCRIPTION OF THE DRAWINGS

The exact nature of this invention, as well as other objects and advantages thereof, will be readily apparent from consideration of the following specification and annexed drawings wherein:

FIG. 1 is an elevation of a portion of the preferred embodiment.

FIG. 2 is a cross section of the preferred embodiment taken on the line 2—2 of FIG. 3, looking in the direction of the arrows.

FIG. 3 is a cross section taken on the line 3—3 of FIG. 1, looking in the direction of the arrows.

FIG. 4 is an elevation partly in section of an alternate embodiment of the invention.

FIG. 5 is a cross section showing a detail of a further alternate embodiment.

DETAILED DESCRIPTION OF THE PREFERRED EMBODIMENTS

Figure 6:
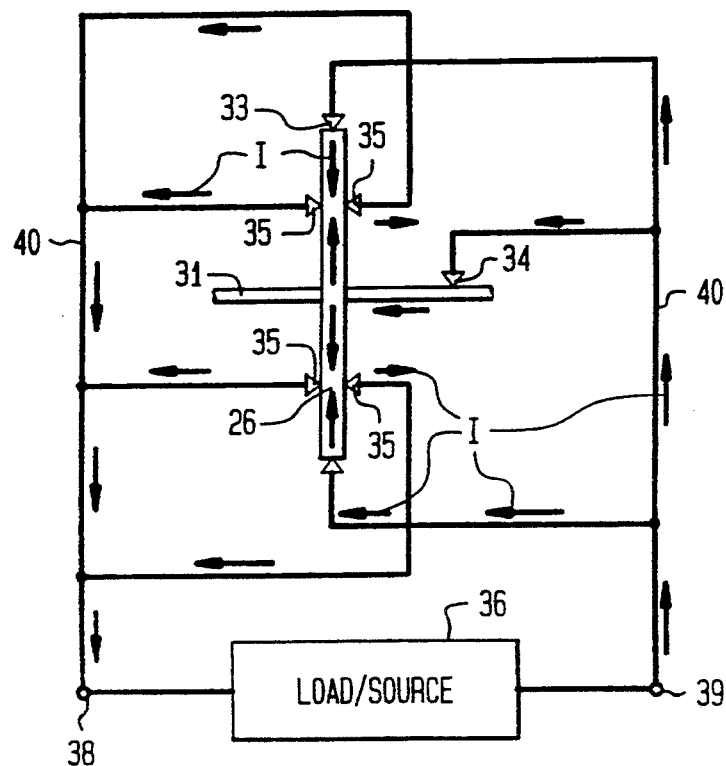
FIG. 6 is a schematic circuit diagram illustrating current flow in the preferred embodiment.

Referring now to the drawings, there is shown in FIGS. 1-3 an electrical machine 20 having two hemispherical, magnetic shells 21, 22 rigidly mounted on the upright arms of a supporting base 23. The magnetic shells 21, 22 have flat, ring-shaped faces 24, 25, respectively, that are spaced to form a short peripheral gap 27 in which a disk-shaped rotor 26 is rotatably mounted. The magnetic shells 21, 22 which are U-shaped and have hemispherical cavities 28, 29, respectively.

A shaft 31, rigidly attached to rotor 26, is mounted for rotation in bearings 30 that are fixed to and pass through the walls of the magnetic shells 21, 22. The rotor 26 is made of a non-magnetic partially conductive material such as copper interspersed with nonconductive material or lamination. The magnetic shells 21, 22 are preferably fabricated from magnetic materials having high coercivity such as alloys of alnico or cobalt and neodymium.

Figure 15:
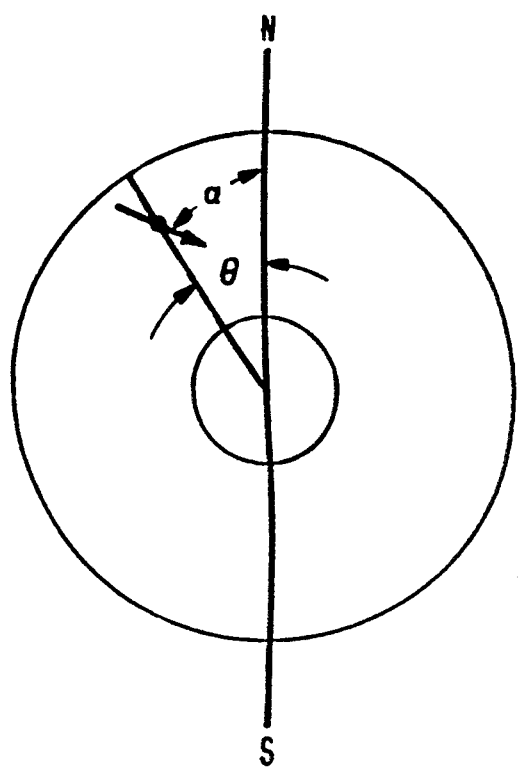
FIG. 15 is a geometric diagram of one aspect of the present invention.

The magnetization of the shells 21, 22 are indicated by the arrows respectively (FIGS. 1, 2). The magnetizations M1, M2 adjacent the gap 27 and in a central, horizontal plane midway between the gap 27 are oriented radially with respect to the axis of shaft 31. Between these positions, the orientation ($\alpha$) of the magnetizations M1, M2 varies gradually in the cross section of the spherical structure by the equation:

$$\alpha = 2\theta$$

where $\theta$ is an axial angle. These values ($\alpha$ and $\theta$) are shown in the geometric illustration of FIG. 15. The value $\alpha$ is a magnetization angle with respect to an axis. A method of fabricating such a structure is taught in U.S. Pat. No. 5,063,004, entitled, "Fabrication of Permanent Magnet Toroidal Rings," issued to the inventor herein on Nov. 5, 1991. This patent is incorporated herein by reference. One can determine the field at the center (or working cavity) of such a configuration by finding the pole densities in the annular shell and on its inner and outer surfaces, inserting those values into Coulomb's equation and integrating over the volume and surfaces of the shells. This calculation is shown in U.S. Pat. No. 4,837,542, entitled, "Hollow Substantially Hemispherical Permanent Magnet High-Field Flux Source For Producing A Uniform High Field," issued to the inventor herein on Jun. 6, 1989, also incorporated herein by reference.

Ideally and is evident from the above equation, the orientation of the magnetization of the shells or magnets 21, 22 varies continuously with and twice as fast as the polar angles wherein the longitudinal axis of shaft 31 defines the polar axis and the hemispherical centers P1, P2 (FIG. 2) of the respective shells 21, 22 define the poles. In general, the magnetizations in the respective shells 21, 22, shown by the arrows in FIG. 2, are antisymmetric in the sense that their shell orientation are reversed at corresponding locations in the shells 21, 22.

For example, in shell 22 along face 25, the magnetization is perpendicular to face 25 and points into gap 27. By contrast, the magnetization of shell 21 along the face 24 is such that the field is perpendicular to face 24 and points away from gap 27. Adjacent to the bearings 30, the magnetization of shell 21 is directed parallel to shaft 31 and points toward the cavity 28, while the magnetization in shell 22 is also directed parallel to shaft 31 but points away from cavity 29. Between these extremes, the magnetization direction varies gradually and continuously. As indicated by the arrows in FIG. 2, the shells 21, 22 generate a ring-shaped or annular field across the gap 27 that is oriented perpendicular to the faces of rotor 26. Further, as illustrated by the arrows in the cavities 28, 29 (FIG. 2), the shells 21, 22 generate an external field over the broad surfaces of rotor 26 adjacent the cavities 28, 29 that is parallel to but oppositely directed to the field in gap 27.

The machine 20 may be used as a homopolar electric motor or a homopolar electric generator. When used as a homopolar generator, a torque is applied to the shaft 31 by motor 100 (or other mechanical energy sources) to cause the rotor 26 to rotate. The fields in gap 27 and cavities 28, 29 will interact with the conductive rotor 26 and cause currents to flow therein. More specifically, assuming that the shaft 31 is rotated by motor 100 in the direction indicated by the arrows T in FIGS. 1 and 3, radial currents I will be induced on the rotor 26 in the directions indicated by the arrows I in FIG. 3. The operation of this device is, therefore, similar to a simple faraday disc, but unlike a faraday disc, the induced currents I will reverse direction at the circular of cavity margin 29 defined by the border between the edge of magnet structure itself and the working cavity 28, 29 (FIG. 3), i.e. along the circular margin of cavity 29 where the magnetic field intercepted by the rotor 26 reverses direction.

The currents I that are induced when machine 20 is operated as a homopolar generator flow as direct currents from the rotor 26 via either brushes 33 (FIG. 5) or via brushes 35 (FIG. 2). Brush 33 may be a hoop-shaped structure that is in electrical contact with the entire outer edge of rotor 26, or brush 33 may comprise short brush segments spaced about the outer edge of rotor 26. Brush 33 is rigidly held in place by an arm 37 (FIG. 3) that forms a part of base 23. Brush 34 (FIG. 2) is in electrical contact with the shaft 31 which may be made of conductive material for providing current flow from the center of rotor 26 to the brush 34. Brushes 35 include two flat, ring-shaped conductors fixed to the faces 24, 25 that have circular contacts in electrical contact with the faces of rotor 26 along the circular margin where the induced currents I change direction (FIG. 5). As those skilled in the art will readily recognize, the brush configuration described above may also be a slip ring attachment.

FIG. 6 is a circuit diagram that illustrates a utilization device, load/source 36, joined by conductors 40 to brushes 33, 34, 35 via terminals 38, 39. When machine 20 is used as a homopolar generator, the electrical load (load/source 36) will utilize the direct current I via terminals 38, 39.

As indicated above, the machine 20 may also be used as a homopolar motor. When machine 20 is used as a motor, a source of power (load/source 36) is connected across the terminals 38, 39, causing direct currents I to flow on rotor 26 in the directions indicated by the arrows in FIG. 6. The interaction between the direct currents I and the fields residing in gap 27 and cavities 28, 29 will create a torque T (FIG. 1) on rotor 26 in the direction indicated in FIGS. 1, 3, thereby causing the shaft 31 to rotate. Under most applications, the magnets 21, 22 will each be of greater mass than the mass of rotor 26. As such, it is usually more efficient to use the magnets 21, 22 as the stators. However, in some applications, it may be desirable to rotate the magnets 21, 22 and hold the rotor 26 stationary.

FIG. 4 illustrates an electrical machine 20, having magnets 21', 22' that are rotated and a conductive member that is fixed. Magnets 21', 22', are mounted on a rotatable shaft 31'. A conductive disk-shaped stator 26', is supported on base 23' Stator 26', has a bearing 30' rotatably mounting shaft 31'. Conductors 40', are joined to the stator 26' at the indicated locations, i.e. the outer edge, the center and the point where the external magnetic fields of magnets 21', 22', reverses direction. The current distribution on the stator 26', will be the same as the current I on rotor 26 (FIG. 3) for situations where the magnetization of magnets 21', 22',and the rotation of shaft 31' are the same as that indicated by the arrows in FIGS. 2 and 3. The elimination of the need for brushes in the FIG. 4 embodiment is an obvious mechanical simplification over the FIGS. 1-3 embodiment.

Of course, the structures are shown in FIGS. 1-4 in a simplified diagrammatic form to represent an ideal case. Using presently available technology it would be difficult to form the magnets 21, 22, 21', 22', i.e. wherein the direction of magnetization varies continuously and smoothly in the manner indicated. However, as disclosed in the '542 patent and the above-cited publications, a segmented approximation (FIG. 5) is readily achievable.

The FIG. 5 embodiment shows magnetic segments 21A-21C and 22A-22C which are joined to approximate the magnets 21, 22, respectively, of FIGS. 1-3. Each segment 21A-21C and 22A-22C is uniformly magnetized in the directions illustrated by the arrows in FIG. 5. The segments 21A-21C and 22A-22C have cone-shaped surfaces that mate with each other to form the overall hemispheres. As indicated in the cited publications, a structure using as few as five segments per great circle of longitude could produce a ninety percent approximation of the ideal structures as seen in FIGS. 1-3.

Figure 14:
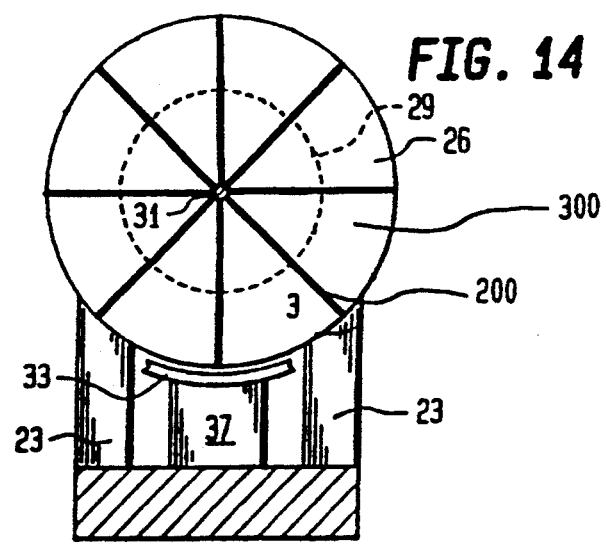
FIG. 14 is a pictorial view of the preferred rotor utilized in the present invention.

FIG. 14 is a partial illustration of the preferred rotor utilized in a motor according to the present invention. As shown, the rotor is sectioned into conductive portions 300 and nonconductive portions 200. Moreover, the rotor, for the configuration in FIGS. 1-3, is constructed such that the portions of the rotor which pass through the gap of the spherical structure are nonconductive or are laminated. The rotor is sectioned in this manner to provide for distinct electric fields when a current I is applied by the brushes 33 or 35. As will be appreciated by those skilled in the art the sectioning of the rotor in this manner will act as separate windings along the surface of the rotor.

Figure 7:
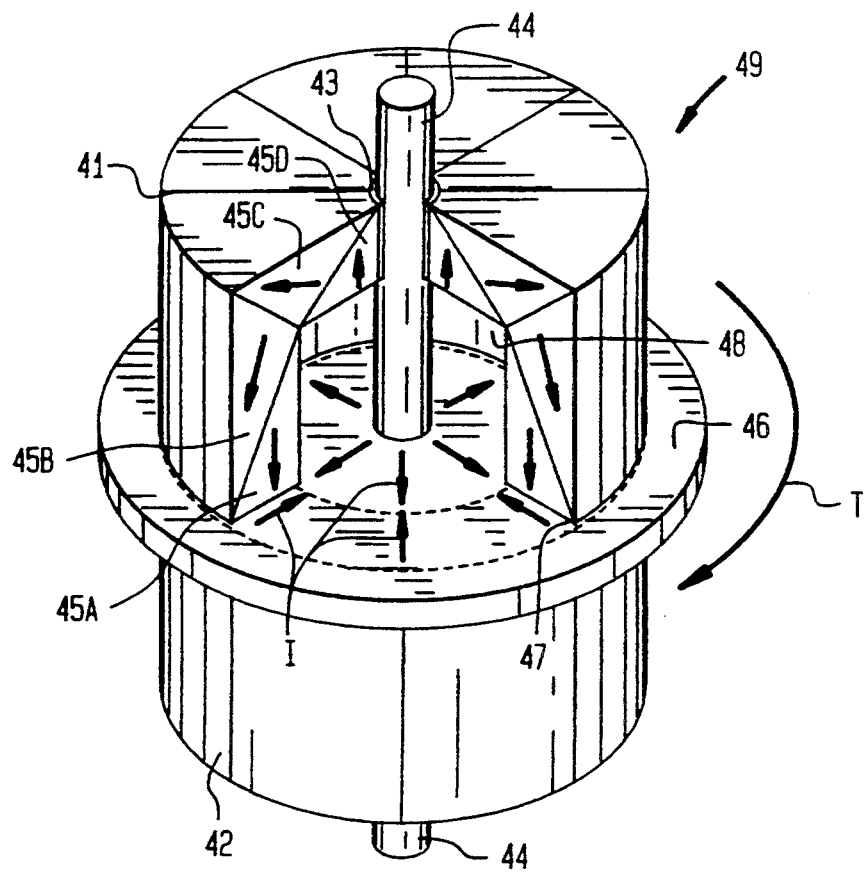
FIG. 7 is a pictorial view with parts broken away of another alternate embodiment.

FIG. 7 illustrates a machine 49 constructed of cylindrically shaped magnets 41, 42, having a plurality of pie-shaped cuts each with four segments 45A, 45B, 45C and 45D. Each segment 45A-45D has a triangular cross section. A bearing 43 is fixed in segments 45B to rotatably support a shaft 44 that is joined to the center of a conductive, disk-shaped rotor 46. Magnets 41 and 42 are supported to form a gap 47 and cavities (only cavity 48 is shown) similar to gap 27 and cavities 28, 29 (FIG. 2). The rotor 46 is free to rotate in gap 47.

The magnetization of each segment 45A-45D is uniform and together they generate an external field that approximates the field of the structure shown in FIG. 2. In general, the field across the gap 47 is parallel to the axis of shaft 44 and is directed downward (FIG. 7). The field in cavity 48 is parallel to the field in gap 47 but directed in the opposite direction, i.e. upwardly as viewed in FIG. 7. The rotor currents I will be distributed radially in the directions indicated by the arrows in FIG. 7 when the rotor 46 is turned in the direction indicated by arrow T. The machine 49 will employ appropriate brushes similar to brushes 33, 34 and 35 of FIG. 2 for applying currents to the rotor 46 when machine 49 is used in the motor mode, or for drawing currents from rotor 46 when machine 49 is used in the generator mode. The segments 45A-45D will in general be easier to manufacture then the segments 21A-21C and 22A-22B of the FIG. 5 embodiment. The permanent magnet structure shown in FIG. 7 is more fully described in U.S. Pat. No. 4,994,777 issued to Leupold et al on Feb. 9, 1991, which is incorporated by reference hereto.

Regardless of the selected configuration for a particular application, it is important only that the magnets be cup-shaped and have a cavity and an annular rim. The cup-shaped configuration will confine most of the external magnetic field to the cavity and the annular rim. A conductive plate is mounted adjacent the rim and the cavity. Either the conductive plate or the magnets may be rotated. When the magnets are rotated the brushes are not necessary.

Figure 8:
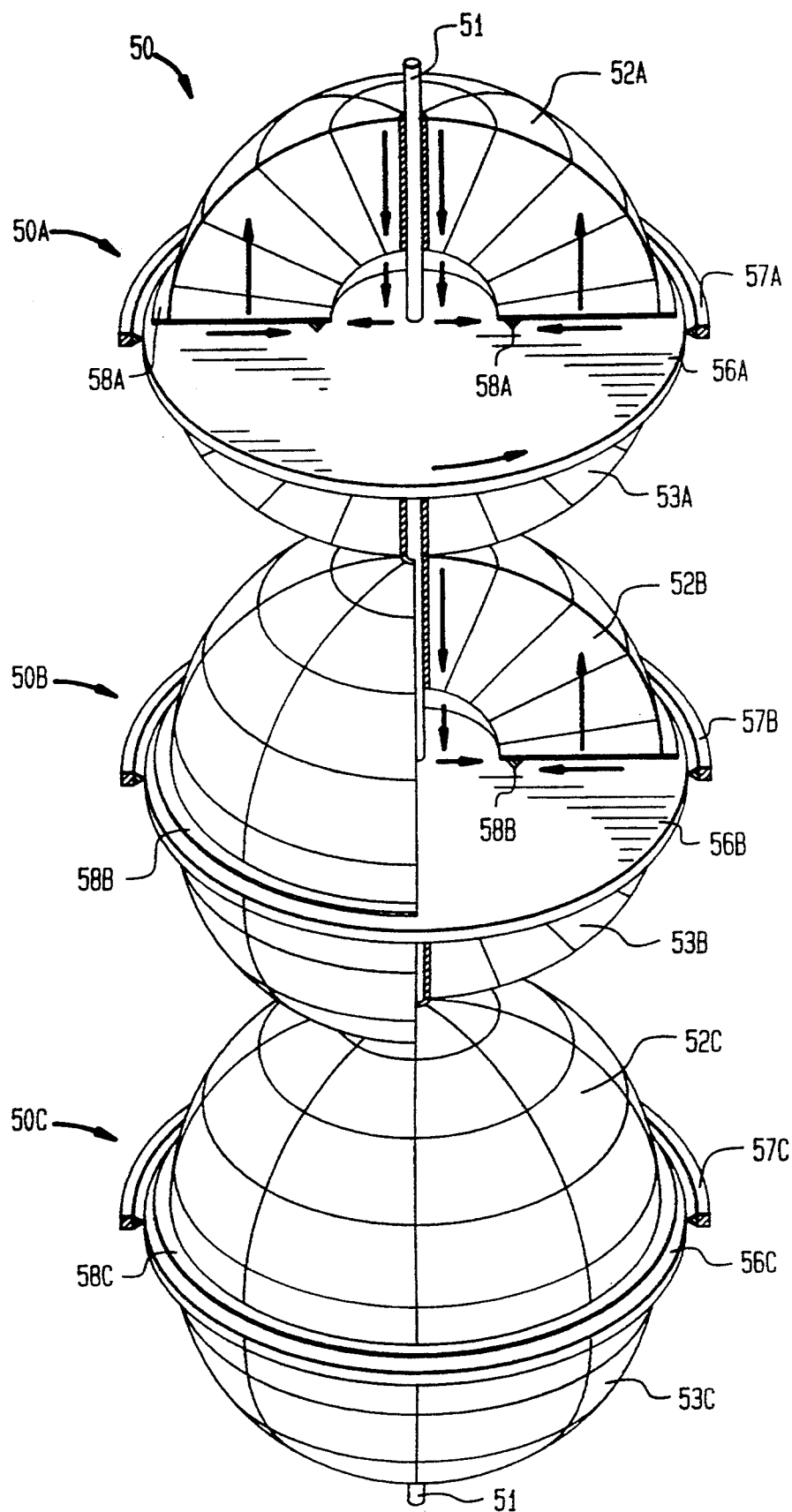
FIG. 8 is a pictorial view partly broken away and partly in section of a further alternate embodiment of the invention.

Because most of the external magnetic field is confined to the cavity and the rim, the power output will be higher than it is in conventional machines of the same size. FIG. 8 illustrates a system 50 constructed from a plurality of identical electrical machines 50A, 50B and 50C mounted on a common shaft 51 that passes through the hemispherical magnets 52A–53C. Disk-shaped rotors 56A–56C are fixed to the shaft 51 for freely rotating in the cavities and gaps formed by magnets 52A–53C. Peripheral brushes 57A–57C and inner brushes 58A–58C are mounted in sliding contact with rotors 56A–56C, respectively. The brushes 57A–57C would be connected in common as would the brushes 58A–58C.

A brush (not shown) would contact the conductive shaft 51 in the same manner as the brush 34 contacts the conductive shaft 31 (FIGS. 2, 6). A similar assembly having any number of tandem machines may be constructed to increase the output power. The machine 49 of FIG. 7 may be ganged in tandem in a similar fashion.

Figure 9:
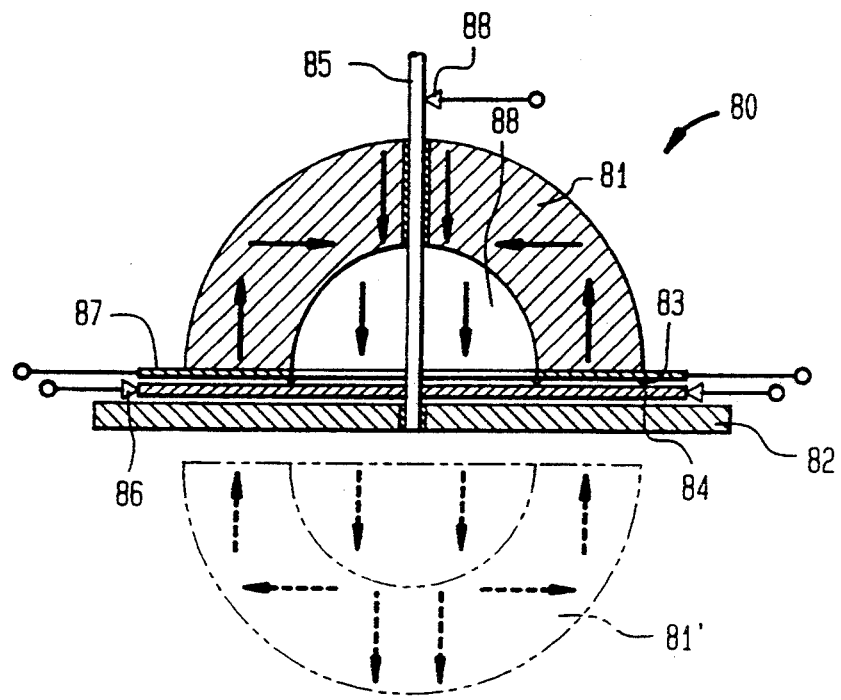
FIG. 9 is an elevation in cross section of still another alternate embodiment of the invention.

With the use of a magnetic mirror, also referred to as an antimirror, the size and mass of the machine may be reduced significantly by eliminating the need for one of the shells. FIG. 9 shows a machine 80 having only one permanent magnet, namely hemispherical shell 81. A magnetic mirror 82, in the form of a flat plate of magnetic material such as iron, is spaced from the peripheral faces of shell 81 to form a gap 83. The shell 81, magnetized in the directions indicated by the arrows, together with the mirror 82 will produce an external field in the cavity 88 and the gap 83 identical to that produced by a similar machine having two shells. The mirror 82 will provide a flux path such that the shell 81 will in effect see an anti-image 811, i.e. the shell 81 and its anti-image 811 will both have the same geometric shape while the shell orientation of their magnetizations will be reversed or antisymmetric as indicated by the arrows.

A disk-shaped conductive rotor 84 is mounted in the gap 83 for rotation with respect to the shell 81 and mirror 82 via shaft 85. Brushes 86, 87, 88 make contact with the rotor 84 and shaft 85 in the same fashion as described earlier for brushes 33, 34, 35 (FIG. 6). The machine 80 may be operated as a homopolar motor or generator in the same manner as the earlier-described machines operate. The current distributions on the rotor 84 will also be similar to the current distributions on the earlier-described machines.

Figure 10:
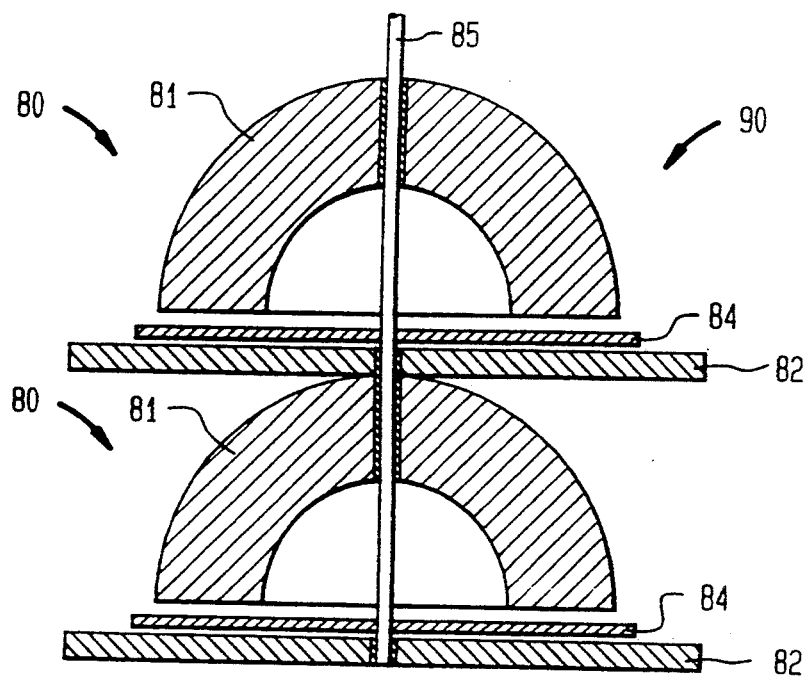
FIG. 10 is a cross section in elevation of a further modification of the invention.

FIG. 10 shows a machine 90 formed from a tandem arrangement of the two machines 80 of FIG. 9. The rotors 84 are fixed to the common shaft 85 which is mounted for rotation in bearings located in the fixed shells 81 and the fixed mirrors 82. Each of the mirrors 82 will produce an anti-image of its corresponding shell 81. Each shell 81 and its corresponding mirror 82 is in effect an independent machine. The brushes 86, 87, 88 are omitted in FIG. 10 for clarity.

In addition to reducing the size and mass of the machines, magnetic mirrors may also be used to simplify machine fabrication. The cup-shaped magnets (magnets 21, 22; 41, 42; 52A, 53A) so far described, must be magnetized in an antisymmetric fashion as described above. However, with the use of magnetic mirrors, machines having magnets which are magnetized with only one type of polarity may be fabricated.

Figure 11:
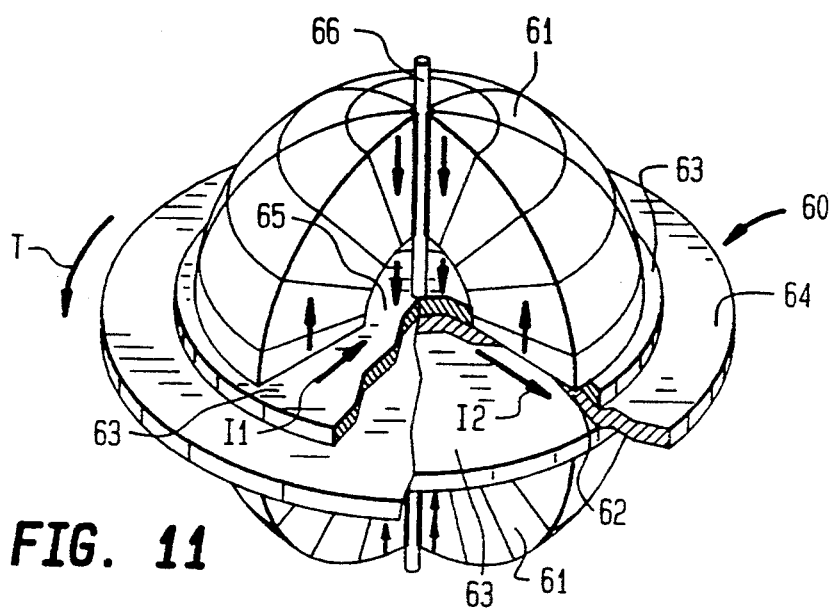
FIG. 11 is a pictorial view with parts broken away of yet another embodiment of the invention.
Figure 12:
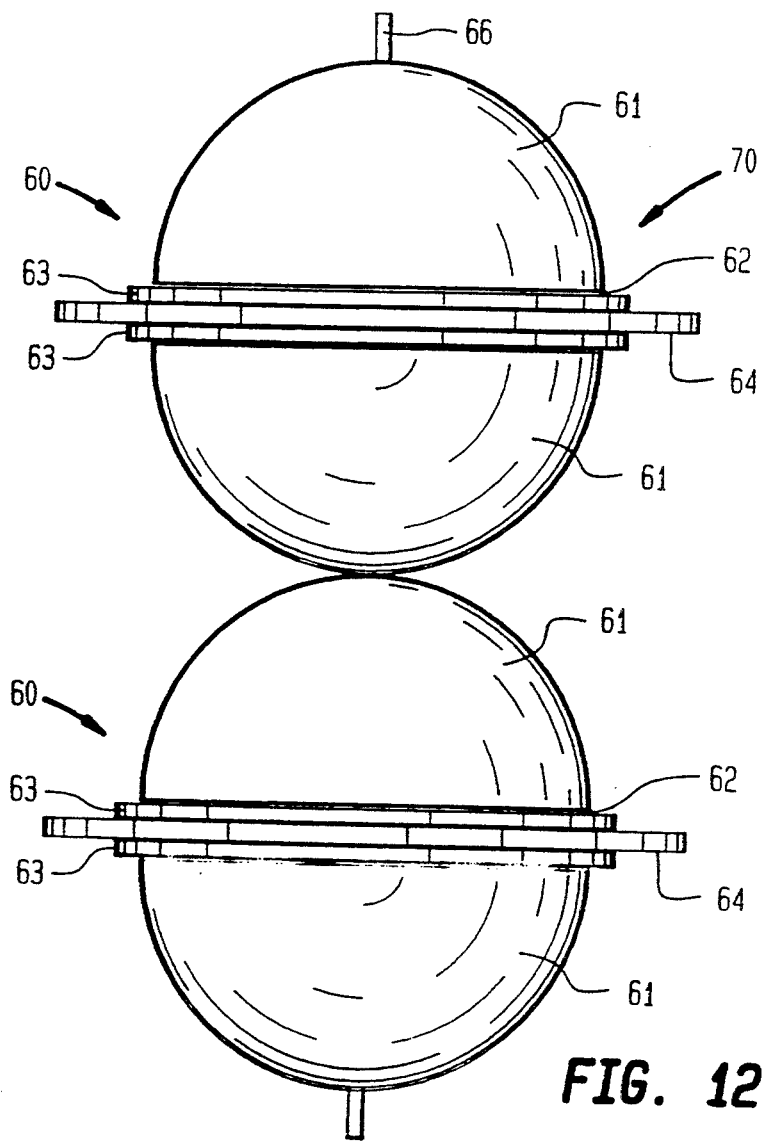
FIG. 12 is an elevation of a still further embodiment of the invention.

FIG. 11 illustrates an electrical machine 60 having two identical hemispherical magnets 61. FIG. 12 illustrates an assembly 70 wherein two identical machines 60 are ganged in tandem. The opposed magnets 61 are spaced to form gaps 62. Two identical disk-shaped conductive rotors 63 are mounted in each gap 62. Sandwiched between each rotor 63 is a magnetic mirror 64. The rotors 63 are fixed at their centers to the shaft 66 that is mounted in bearings that pass through the magnets 61. The mirrors 64 are spaced from the rotors 63 and may or may not be mounted to rotate with shaft 66.

Figure 13:
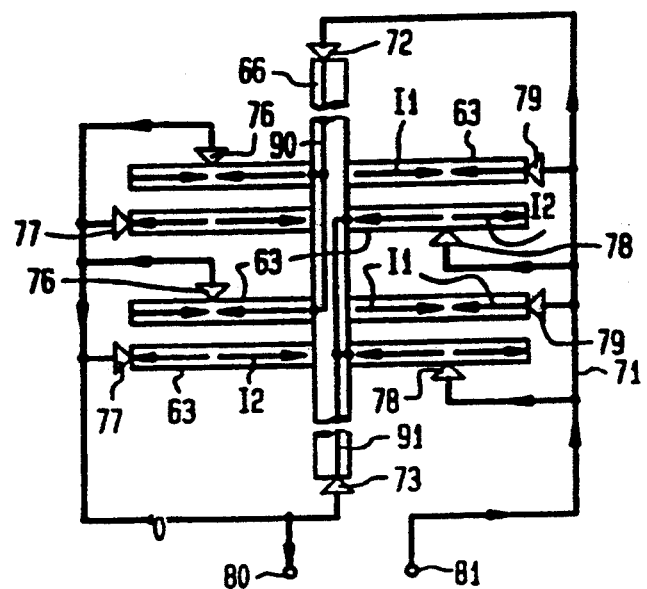
FIG. 13 is a schematic circuit diagram illustrating current flow for the embodiment shown in FIG. 12.

As indicated by the arrows in FIG. 11, the currents I1 on the upper rotor 63 will flow in the opposite direction to the currents I2 on the lower rotor 63. Because of this, it will be necessary to connect the various points on the rotors 63 appropriately. FIG. 13 is a circuit diagram showing the two pairs of rotors 63 and the shaft 66 of the FIG. 12 embodiment. It is first noted that the shaft 66 has two separate conductive paths 90, 91 leading to two brushes 72, 73. The centers of the upper rotors 63 are connected to brush 72 via path 90 while the centers of the lower rotors 63 are connected to brush 73 via path 91. Connected in common are the edge brushes 79 and the inner brushes 78. The edge brushes 77 and the inner brushes 76 are also connected in common. Terminal 80 is connected to brushes 73, 76, 77. Terminal 81 is connected to brushes 72, 78, 79. The electrical load, in the case of a generator, or the electrical power source, in the case of an electrical motor, is connected across the terminals 80, 81. The circuit of FIG. 13 illustrates a parallel connection of the rotors 63 and the terminals 80, 81. It will be evident to those skilled in these arts that a series connection of these elements would also be an appropriate alternative.

The machine 60 and assembly 70 may be cheaper and easier to manufacture because the cup-shaped magnets 61 are identical. However, it is noted that the magnetic mirror 64 in some applications may be a limiting factor. The amount of power output from a machine 60 will depend on the amount of magnetic flux that the mirror 64 can conduct. However, such mirrors 64 may become saturated at a level that may limit the power.

Various other modifications and alterations are contemplated and may obviously be resorted to by those skilled in the art in the light of the above teachings. It is therefore to be understood that, within the scope of the appended claims, the invention may be practiced otherwise than as specifically described.

What is claimed is:

1. A homopolar generator comprising:
    a first permanent magnet structure having two permanent magnet shells which are U-shaped in a cross section, the first permanent magnet structure having a hollow central cavity such that when the magnet shells are placed together the first permanent magnet structure is a hollow sphere having a spherical gap between the two permanent magnet shells, said shells being magnetized such that an orientation of their magnetization $\alpha$ varies over the cross section of said shells by the equation: $\alpha = 2\theta$, where $\theta$ is an axial angle, and such that a radial transverse magnetic field is generated in said hollow central cavity;
    an electrically conductive disk rotatably and coaxially mounted with respect to said first permanent magnet structure within said spherical gap and lying in said transverse magnetic field;
    an electrical load; and
    conductive brushes connecting the electrical load to the conductive disk; and
    means to rotate the conductive disk within said magnet structure.

2. The generator of claim 1 wherein the conductive disk is only partially conductive.

3. The generator of claim 2 wherein said brushes are sliding contacts contacting the conductive disk at an outer rim and center of the conductive disk.

4. The generator of claim 2 wherein said means to rotate the conductive disk is a motor.

5. A homopolar generator comprising:

a permanent magnet structure having a U-shaped magnet shell and a magnetic mirror mounted adjacent said magnet shell, the permanent magnet structure having a hollow central cavity such that when the U-shaped magnet shell and magnetic mirror are placed together the permanent magnet structure is a hollow hemisphere having a circular gap between the magnet shell and the magnetic mirror, said shell being magnetized such that an orientation of its magnetization $\alpha$ varies over the cross section of said shell by the equation: $\alpha = 2\theta$, where $\theta$ is an axial angle, and such that a radial transverse magnetic field is generated in said hollow central cavity;

an electrically conductive disk rotatably and coaxially mounted with respect to said magnet shell within said gap and lying in said transverse magnetic field;

an electrical source; and conductive brushes connecting the electrical source to the conductive disk.

* * * * *